Figure 1:
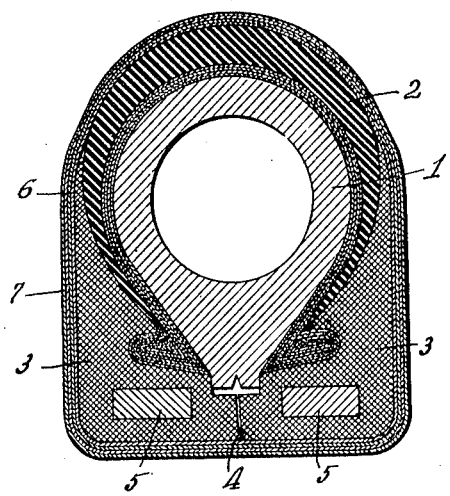

J. N. SATTERTHWAITE.
APPARATUS FOR MAKING TIRES.
APPLICATION FILED DEC. 2, 1911.

1,035,749.

Patented Aug. 13, 1912.

Witnesses
H. C. Robinette
R. F. Steward

Inventor
Joseph N. Satterthwaite
By K. P. McElroy
Attorney

UNITED STATES PATENT OFFICE.

JOSEPH NORMAN SATTERTHWAITE, OF TRENTON, NEW JERSEY, ASSIGNOR TO EMPIRE TIRE COMPANY, OF TRENTON, NEW JERSEY, A CORPORATION OF NEW JERSEY.

APPARATUS FOR MAKING TIRES.

1,035,749.

Specification of Letters Patent.

Patented Aug. 13, 1912.

Application filed December 2, 1911. Serial No. 663,502.

*To all whom it may concern:*

Be it known that I, JOSEPH NORMAN SATTERTHWAITE, a citizen of the United States, residing at Trenton, in the county of Mercer and State of New Jersey, have invented certain new and useful Improvements in Apparatus for Making Tires, of which the following is a specification.

This invention relates to apparatus for making tires; and it comprises a suitable core or mandrel of a contour adapted to fit into the interior of a tire shoe and upon which a pneumatic tire shoe is built up and formed, and suitable pads or side rings each of which comprises a body of non-metallic and more or less flexible material, such as fabric or the like, internally reinforced by an annular metallic stiffening member embedded in and surrounded by the body of the pad in such a manner that the metal reinforce cannot contact with a tire shoe when in use, each pad being shaped on an inner face so as to engage closely the exterior surface of the lower part and side of a tire shoe, and having an outer face so contoured that the outer surface of the final assemblage of core, tire shoes, and mold pads is substantially smooth and free of reëntrant angles; all as more fully hereinafter described and as claimed.

In curing or vulcanizing pneumatic tire shoes, it has heretofore been the general practice to build up the tire shoe on a suitably shaped mandrel and then clamp the tire shoe to the mandrel by means of metallic rings directly engaging and contacting with either the greater portion of the tire exterior, or in some cases, only with the lower portion and sides of the tire shoe. The resulting assemblage is then generally wrapped with moist fabric, tape or rags and the tire is finally subjected to a vulcanizing operation such as a treatment with live steam for a suitable period. It is found that under these conditions the different portions of the outer surface of the tire cure or vulcanize differently where the portions are and are not in contact with metal during the process. The character of the cure obtained where the rubber is not in contact with metal, often referred to as the "open cure," is generally believed to be superior to that where there is a contact of rubber with metal. The open cured portion of a tire shoe is usually distinguishable by the markings on it of the fabric used to wrap the tire, while the other portions of the tire surface which are cured in contact with metal are generally smooth and somewhat darker in color. The appearance of a tire whose surface is thus partially open cured and partially cured in contact with metal, is undesirable in the trade, and furthermore, the wearing qualities of the tire are, as a rule, not uniform over the entire surface, the metal cured and open cured portions differing materially in this respect as well as in appearance.

Various methods and forms of apparatus have been proposed heretofore to remedy the foregoing disadvantages. Until recently however it has always been considered necessary to clamp at least the lower portions of the tire, including a portion of the sides, between metallic pressure rings tightly drawn toward each other by suitable bolts or other securing means. In all such forms of apparatus, the disadvantages above pointed out are of course unavoidable to a greater or less degree. In an application of Charles H. Semple, Serial No. 612,812, filed March 7, 1911, and copending herewith, (matured into Patent 1,034,372) there is described and claimed, however, an apparatus for molding tires in which are employed mold pads or rings of non-metallic and more or less flexible material and of such a character that when the assemblage of core, tire, and mold pads is wrapped with tape, a substantially uniform constrictive pressure is obtained over the entire exterior of the tire shoe. Furthermore, since the mold pads are generally of fabric material, the appearance of the entire outer tire surface after vulcanization is uniform and shows the fabric markings characteristic of the open cure method. The character of the cure itself is also of course more uniform. These fabric pads have proved highly successful in practice and are far superior to the metallic side rings of the prior art.

It is the object of the present invention to secure still more advantageous results by certain changes in the means employed. Mold pads like those disclosed in the said copending application, built up of fabric, such as "frictioned fabric" (fabric treated with rubber), are apt after use for some time to warp somewhat and occasion some difficulties in securing proper engagement with the tire formed on the annular core. This is due probably in part to the curing of the contained rubber and to the repeated alternate wetting and drying of the pad incidental to the wrapping with moist tape and subsequent treatment with steam under pressure. The non-metallic material of the pad is more or less subject to this warping and deformation.

In the present invention I have devised an apparatus which retains all the advantages of the fabric pads of the type above described and secures certain other and new advantages while obviating the stated difficulties. I provide an annular core or mandrel, which may be collapsible or not according to the particular circumstances, upon which the tire shoe is built up and formed. In conjunction with this mandrel I employ annular mold pads or rings, the body of each of which comprises non-metallic material such as fabric or the like in which is embedded and isolated a rigid reinforcing annular member. The surface of each such pad is non-metallic and the reinforcing member, which may be of steel, may be said to be in a more or less "floating" condition, since it is more or less yieldingly supported in the non-metallic material forming the body of the pad. The dimensions of this reinforcing member should be such as to prevent the warp or distortion of the pad in use. The reinforcement may be of any desired shape. An annular band of rectangular cross section embedded in the lower part of the pad is found in practice to give excellent results. It is also found that if the reinforcing member be of a cross sectional outline similar to that of the pad in which it is embedded, an even more advantageous result is secured. Whatever be the form of the metallic reinforcing member it should be so located within the pad that a substantial mass or layer of the non-metallic material of the pad spaces the reinforcing member from the tire shoe when the pad is applied thereto. In this way the advantages resulting from the use of flexible and resilient non-metallic pads are retained, while deformation of such pads is effectually prevented.

In the accompanying drawings I have shown, more or less diagrammatically, certain embodiments of the present invention.

Figure 2:
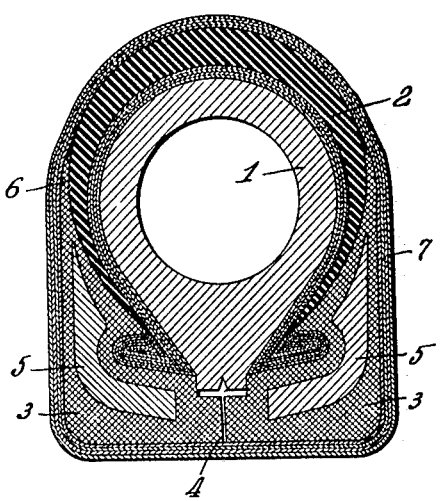
Figure 3:
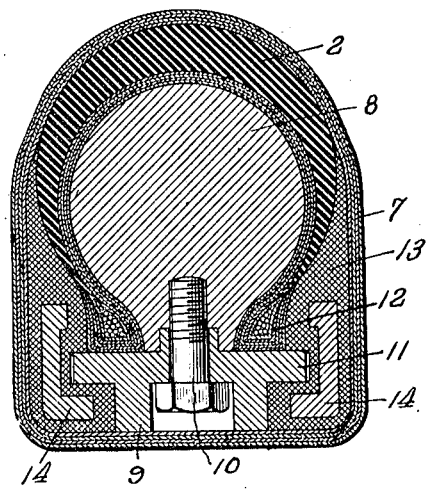
Figure 4:
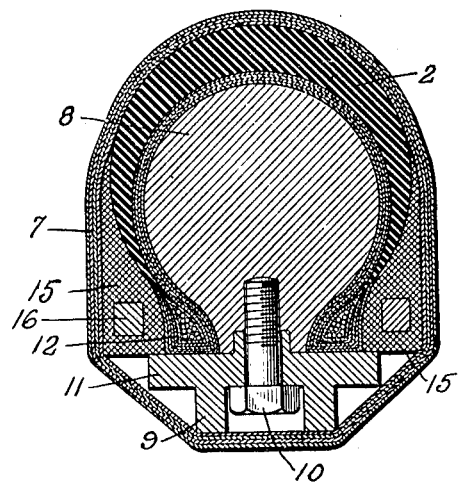

In this showing, Figures 1 and 2 are cross sections of apparatus suitable for making clencher tires, showing different forms of pad reinforcement; and Figs. 3 and 4 are similar views of apparatus suitable for making straight-edge tires.

Referring particularly to Figs. 1 and 2, 1 is an annular core or mandrel which may be solid, be hollow as shown, or which may be solid, and which is conveniently made of cast iron or other suitable material. 2 is a tire shoe or body mounted on the core, this tire shoe being of the clencher type as indicated. Pads 3 abutting, or nearly abutting, at 4 are built up of non-metallic material, generally of a fibrous and more or less flexible nature, and most conveniently of "frictioned fabric", that is, fabric which has been rubberized or impregnated with rubber. The inner face of each pad conforms closely to the tire shoe exterior, while the outer face is of a generally smooth rounded outline and free of reëntrant angles. The outer lateral faces of the pads are conveniently flattened somewhat in order that a number of sets of apparatus may be superposed and firmly held together during vulcanizing or other treatment. Embedded in and wholly surrounded by the material of these non-metallic pads are annular reinforcing members 5, which are best in the form of continuous annuli of iron or steel or other stiff and rigid material. In Fig. 1 these reinforcing members are shown as of rectangular cross section, while in Fig. 2 the outline of the cross section resembles that of the cross section of the pad itself. This latter form is found in practice to be particularly advantageous. These fabric pads extend upwardly along the sides of the tire shoe, conveniently about half way to the top of the tire as indicated at 6. Wrappings 7 which are usually of fabric strips or tape are wound around the assemblage of core, tire shoe, and side pads to hold the same firmly together during the subsequent curing treatment. These wrappings are best applied somewhat moist and by their shrinking during the vulcanizing or curing operation, they serve to produce a substantially uniform constricting pressure over the entire outer surface of the tire shoe.

In Fig. 3 the core 8 is shown as solid in cross section and is somewhat similar to one of the types described in the copending application 612,812 before referred to wherein the core is composed of a number of sections. These sections are held in place by a retaining ring 9, also sectional, secured to the core by bolts 10. The heads of these bolts are best countersunk in the retaining ring as indicated to give a substantially smooth exterior contour to the final wrapped assemblage. Flanges 11 of the ring may extend just to the outer edges of the tire beads 12, or they may extend a short distance therebeyond, in order to prevent flow of the rubber "dough" down over the edges of the ring during the curing of the tire. Pads 13 are constructed similarly in a general way to those before described, their inner faces being shaped to engage closely the lower portions of the tire shoe and the retaining ring. The reinforcing members 14 are in this instance advantageously annular channels embedded in and surrounded by the fibrous material of the pad as before.

Fig. 4 illustrates still another embodiment of the invention useful in making straight edge tires. In this type of apparatus, the mold pads 15 are of a generally triangular cross-section, and are of a diameter such that their inner peripheral faces are substantially flush with the outer peripheral faces of the flanges on the retaining ring. Embedded in the fibrous material of each pad is an annular reinforcing member 16 of steel or the like. The other elements of the apparatus are substantially as in Fig. 3. With this form of apparatus, the pads do not, of course, abut; nor is their inward movement against the tire beads in any way limited or determined by the retaining ring flanges or other positive means. The extent of such inward movement is determined solely by the resistance of the tire beads themselves to the compressive strain forcing the mold pads against them. As shown in the drawing the fabric wrappings span an annular space between the wrappings and the lateral surfaces of the retaining ring. This space may be partially or wholly filled by means of suitable filling rings; but ordinarily this is not necessary since the character of the constricting pressure of the spanning tape against the pads thus obtained is advantageous rather than otherwise.

The method of employing the apparatus described is sufficiently obvious from the foregoing. The tire carcass is first built up on the core or mandrel by applying a plurality of plies or rubber-treated fabric thereto and ironing them down into close contact therewith. Rubber "dough", that is, soft rubber with suitable admixed filling materials and vulcanizing agents is then applied to the built-up carcass and shaped to give the contour of a finished tire. The mold pads are then set in place, one on each side of the tire, and are pressed into close contact with the tire. Finally, moist fabric wrappings or tape are wound tightly around the assemblage of core, tire, and mold pads, and the whole is subjected to a suitable vulcanizing process, such as treatment with steam under pressure, for an appropriate period of time. In this vulcanizing operation, the moist tape wrappings shrink considerably and are thus put under increased tension. By reason of the flexible and more or less yielding nature of the reinforced fabric pads, this tension produces a substantially uniform constrictive pressure over the entire surface of the tire in contact with the pads. Slight inequalities and irregularities in the tire surface do not materially affect the uniformity of this pressure, since the non-rigid character of the pad faces enables the pads to accommodate themselves readily to such superficial inequalities and to secure good contact with the tire surfaces at all points in the portions covered by the pads. The outer portions of the tire not covered by the pads are of course in contact with the tape wrappings and are subjected thereby to direct constrictive pressure of a similar character to that just described. The whole exterior of the tire is thus cured under practically uniform pressure and out of contact with metal, and under conditions which are substantially those of the desirable "open cure". At the same time, the warping of the fabric pads is entirely prevented by the steel reinforcing members, which, however, in no way adversely affect the desirable qualities of the fabric pads not so reinforced.

What I claim is:—

1. Apparatus for making tires, comprising an annular core shaped to fit the interior of a tire shoe, and a pair of annular side pads for holding a tire shoe on said core, each of said pads comprising fibrous non-metallic material within which is embedded and isolated a continuous annular reinforcing body.

2. Apparatus for making tires, comprising, in combination with an annular core or mandrel adapted to have a tire body mounted thereon, annular mold pads laterally contacting with said tire and holding the same against said core, each of said pads comprising fibrous non-metallic material and suitable stiffening and reinforcing means therefor.

3. Apparatus for making tires, comprising, in combination with an annular core or mandrel adapted to have a tire body mounted thereon, annular mold pads laterally contacting with said tire and holding the same against said core, each of said pads comprising fibrous non-metallic material and suitable stiffening and reinforcing means therefor, and fabric wrappings surrounding and securing together the assemblage of parts enumerated when the tire is in place.

4. Apparatus for making tires, comprising an annular core shaped to fit the interior of a tire shoe, and a pair of annular side pads for holding a tire shoe on said core, each of said pads comprising fibrous non-metallic material within which is embedded and isolated a continuous steel annulus.

5. In apparatus for making tires, an annular mold pad comprising rubberized fabric and a reinforcing steel annulus embedded in and surrounded by said fabric.

6. An apparatus for making tires, a mold pad comprising an annular body of fibrous non-metallic material, and stiffening and reinforcing means embedded in and surrounded by said material.

7. In apparatus for making tires, a mold pad comprising an annular body of fibrous non-metallic material stiffened and reinforced by a metallic member incased by said material.

In testimony whereof, I affix my signature in the presence of two subscribing witnesses.

JOSEPH NORMAN SATTERTHWAITE.

Witnesses:
NELSON E. CRAMER,
A. H. BATTYE.

Copies of this patent may be obtained for five cents each, by addressing the "Commissioner of Patents, Washington, D. C."